United States Patent [19]

Sam

[11] 3,862,937
[45] Jan. 28, 1975

[54] 6-PHENETHYL-3-PIPERIDINECARBOXAMIDES
[75] Inventor: Joseph Sam, Oxford, Miss.
[73] Assignee: The University of Mississippi, University, Miss.
[22] Filed: Feb. 23, 1972
[21] Appl. No.: 228,768

[52] U.S. Cl....... 260/247.5 G, 260/293.76, 424/248
[51] Int. Cl............................................. C07d 87/40
[58] Field of Search... 260/293.77, 247.5 R, 293.76, 260/247.5 G

[56] References Cited
UNITED STATES PATENTS
3,586,678   6/1971   Kuhnis et al.................. 260/293.76

Primary Examiner—Donald G. Daus
Assistant Examiner—Jose Tovar
Attorney, Agent, or Firm—William D. Stokes

[57] ABSTRACT

Compounds of the formula

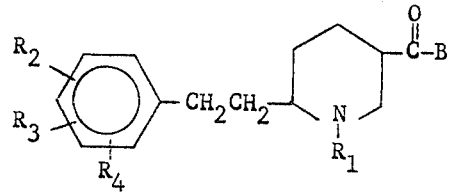

wherein B is lower-alkylamino or morpholino, $R_1$ is lower alkyl, and $R_2$, $R_3$ and $R_4$ are hydrogen or lower alkoxy, have good antidepressant activity.

7 Claims, No Drawings

6-PHENETHYL-3-PIPERIDINECARBOXAMIDES

This invention relates to novel piperidinecarboxamide derivatives having biological activity.

The novel compounds of the present invention are 1-alkyl-6-arylethyl-3-piperidinecarboxamides of the general formula

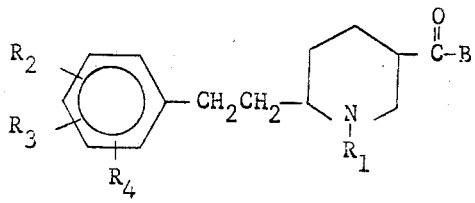

wherein B is lower-alkylamino or morpholino, $R_1$ is lower alkyl, and $R_2$, $R_3$ and $R_4$ are hydrogen or lower alkoxy.

The term "lower alkyl" as used herein per se and as included in the terms "lower alkoxy" and "lower-alkylamino" means saturated monovalent aliphatic radicals of the general formula $-C_mH_{2m+1}$ wherein $m$ designates an integer of less than six and is inclusive of both straight-chain and branched-chain radicals. The term "lower-alkylamino" as used herein means amino radicals of the general formula $-NR_5R_6$ wherein $R_5$ and $R_6$ are the same or different and at least one of which is lower alkyl.

The compounds of this invention may be conveniently synthesized by reactions involving first the conversion of 6-methyl-3-pyridinecarboxylic acid with the appropriate amine to the corresponding 6-methyl-3-pyridinecarboxamide (a), which can then be alkylated in the 1-position to form a quaternary salt; i.e., a 1-alkyl pyridinium compound, with an alkyl halide; e.g., methyl, ethyl, propyl iodides or bromides, etc., (b). The quaternary salt can next be reacted with the appropriate benzaldehyde to form the corresponding stilbazole quaternary salt; i.e., a 6-styryl-1-alkyl pyridinium compound (c), which can then be converted by catalytic reduction; e.g., by hydrogeneration in the presence of a platinum oxide catalyst, to form the 1-alkyl-6-arylethyl-3-piperidinecarboxamide (d).

The above syntheses can be illustrated by the following equations:

(a)
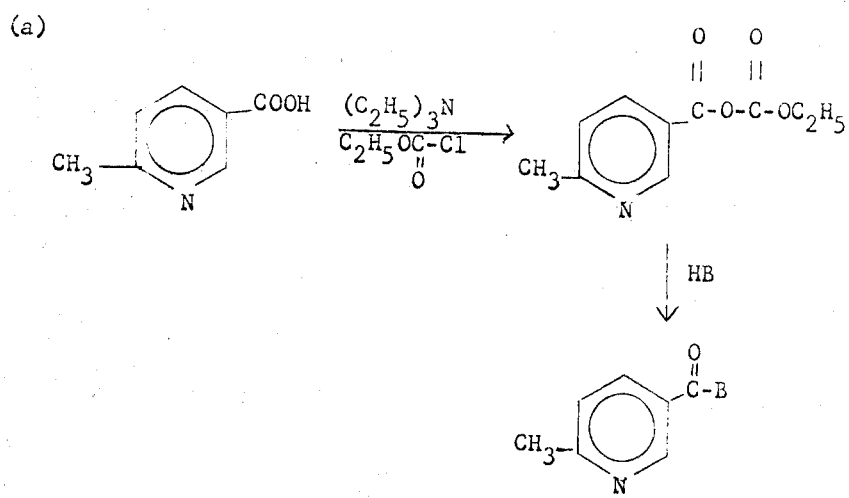

(b)
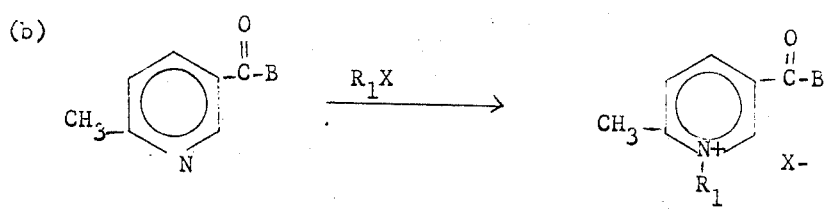

(c)
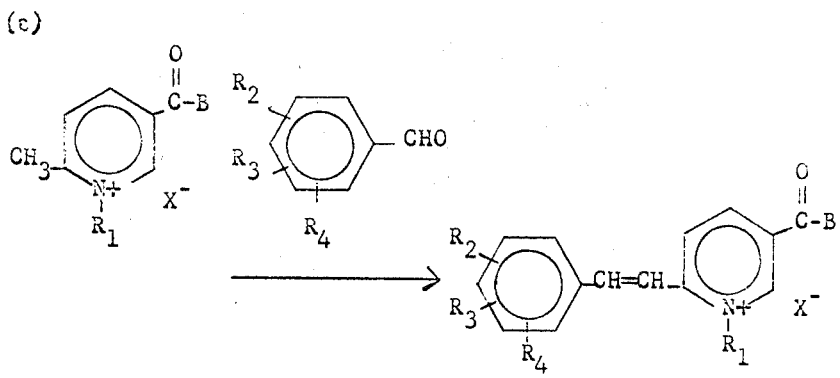

(d)

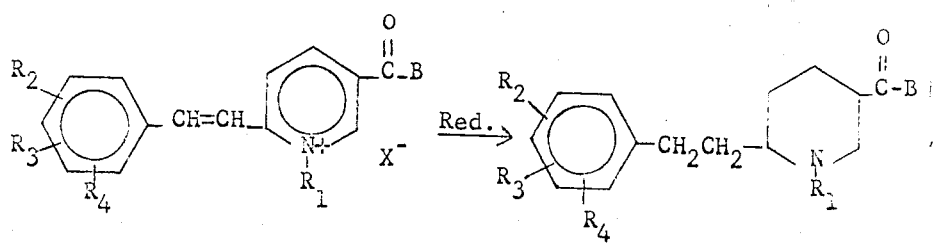

In the above formalae, the symbols B, $R_1$, $R_2$, $R_3$ and $R_4$ have the same meaning as given hereinabove, and X represents halogen; e.g., iodine, bromide or chloride.

The novel 1-alkyl-6-arylethyl-3-piperidinecarboxamides of the present invention have useful biological activity, for example, antidepressant activity, and they may be employed in the usual forms for therapeutic administration. For example, they may be formulated with a pharmaceutical carrier or excipient to provide tablets, capsules, suppositories or injection solutions.

The following examples are given to illustrate the scope of this invention without limiting it thereto.

EXAMPLE 1

1-methyl-6-phenethyl-3-diethylaminocarbonyl-piperidine

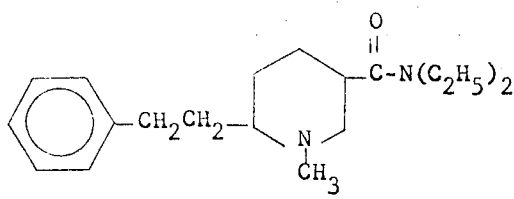

a. To a stirred and cooled mixture of 6-methyl-3-pyridinecarboxylic acid (0.1 mole, 13.7 g.) and 250 ml. methylene chloride, triethylamine (0.1 mole, 10.1 g.) was added gradually. The resulting clear solution was kept at 0°–3°C., while ethyl chloroformate (0.11 mole, 10.5 ml.) was added dropwise with stirring over about 15 minutes. While maintaining the temperature at 0°–3°C. throughout, the mixture was stirred for 30 minutes and then diethylamine (0.1 mole, 7.3 g.) was added dropwise. After warming to room temperature, the mixture was washed with 300 ml. water and the methylene chloride phase was separated, dried over anhydrous potassium carbonate and distilled to give 6-methyl-3-diethylaminocarbonylpyridine.

b. A solution of 6-methyl-3-diethylaminocarbonyl-pyridine (0.05 mole, 9.8 g.) and methyl iodide (0.06 mole, 8.5 g.) in 300 ml. benzene was heated to reflux for 20 hours. The solid quaternary salt, 6-methyl-3-diethylaminocarbonyl-1-methylpyridinium iodide, which formed as a precipitate, was filtered off and recrystallized from ethanol.

c. A solution of 6-methyl-3-diethylaminocarbonyl-1-methylpyridinium iodide (0.02 mole, 6.8 g.), benzaldehyde (0.04 mole, 4.2 g.) and piperidine (1.0 ml.) in 35 ml. dimethyl formamide was stirred at room temperature for 24 hours. After evaporation of the solvent under reduced pressure, the residue was treated with 100 ml. cold water. The precipitate was removed by filtration, washed thoroughly with cold water, then with ether and recrystallized from acetonitrile, to give 5.6 g. of the stilbazole quaternary salt, 6-styryl-3-diethylaminocarbonyl-1-methylpyridinium iodide, M.P. 204°–205° C.

Analysis. — Calculated for $C_{19}H_{23}IN_2O$: C, 54.01; H, 5.49; N, 6.64. Found: C, 53.84; H, 5.65; N, 6.94.

d. A suspension of this stilbazole quaternary salt (0.01 mole, 4.3 g.) in 60 ml. water was hydrogenated in the presence of 0.5 g. platinum oxide catalyst at 48 psi for 24 hours. After removal of the catalyst by filtration, the filtrate was neutralized with saturated sodium carbonate solution and then extracted three times with 50 ml. methylene chloride. After drying over anhydrous magnesium sulphate and evaporation of the solvent, the product was purified by elution chromatography using neutral alumina I and anhydrous ether as the eluent, to give 2.3 g. 1-methyl-6-phenethyl-3-diethylaminocarbonylpiperidine, B.P. 166°–170° C./0.35 mm., $n_D^{29}$ 1.5190.

Analysis. — Calculated for $C_{19}H_{30}N_2O$: C, 75.45; H, 10.00; N, 9.26. Found: C, 75.07; H, 10.36; N, 9.28.

EXAMPLE 2

1-methyl-6-(3,4-dimethoxyphenethyl)-3-diethylaminocarbonylpiperidine

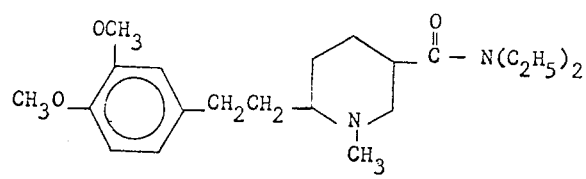

The procedures set forth in Example 1 were repeated, except that in step (c), the benzaldehyde was replaced by 3,4-dimethoxybenzaldehyle (0.04 mole, 6.6 g.), to give 4.1 g. of the stilbazole quaternary salt, 6-(3,4-dimethoxystyryl)-3-diethylaminocarbonyl-1-methyl-pyridinium iodide, M.P. 180°–181°C.

Analysis. — Calculated for $C_{21}H_{27}IN_2O_3$: C, 52.28; H, 5.64; N, 5.81. Found: C, 51.94; H, 5.97; N, 5.91.

In step (d), the reduction of this stilbazole quaternary salt (0.008 mole, 3.9 g.) gave 2.2 g. 1-methyl-6-(3,4 dimethoxyphenethyl)-3-diethylaminocarbonylpiperidine, $n_D^{28}$ 1.5224.

Analysis. — Calculated for $C_{21}H_{34}N_2O_3$: C, 69.58; H, 9.45; N, 7.73. Found: C, 69.83; H, 9.98; N, 7.74.

EXAMPLE 3

1-methyl-6-(3,4,5-trimethoxyphenethyl)-3-diethylaminocarbonylpiperidine

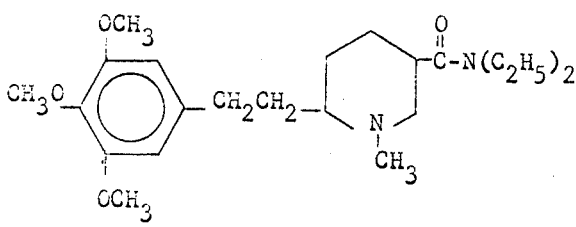

The procedures set forth in Example 1 were repeated, except that in step (c), the benzaldehyde was replaced by 3,4,5-trimethoxybenzaldehyde (0.04 mole, 7.8 g.), to give 6.8 g. of the silbazole quaternary salt, 6-(3,4,5-trimethoxystyryl)-3-diethylaminocarbonyl-1-methylpyridinium iodide, M.P. 208°–209° C.

Analysis. — Calculated for $C_{22}H_{29}IN_2O_4$: C, 51.56; H, 5.71; N, 5.47. Found: C, 51.13; H, 5.56; N, 5.83.

In step (d), the reduction of this stilbazole quaternary salt (0.01 mole, 5.2g.) gave 3.2 g. 1-methyl-6-(3,4,5-trimethoxyphenethyl)-3-diethylaminocarbonylpiperidine, $n_D^{27.5}$ 1.5259.

Analysis. — Calculated for $C_{22}H_{36}N_2O_4$: C, 67.32; H, 9.24; N, 7.14. Found: C, 66.99; H, 9.05; N, 7.26.

EXAMPLE 4

1-methyl-6-phenethyl-3-(4-morpholinocarbonyl)-piperidine

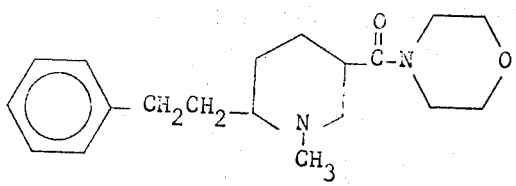

a. To a stirred and cooled mixture of 6-methyl-3-pyridinecarboxylic acid (0.1 mole, 13.7 g.) and 250 ml. methylene chloride, triethylamine (0.1 mole, 10.1 g.) was added gradually. The resulting clear solution was kept at 0°–3° C. while ethyl chloroformate (0.11 mole, 10.5 ml.) was added dropwise with stirring over about 15 minutes. While maintaining the temperature at 0°–3° C. throughout, the mixture was stirred for 30 minutes and then morpholine (0.1 mole, 8.7 g.) was added dropwise. After warming to room temperature, the mixture was washed with 300 ml. water and the methylene chloride phase was separated, dried over anhydrous potassium carbonate and distilled to give 6-methyl-3-(4-morpholinocarbonyl)pyridine.

b. A solution of 6-methyl-3-(4-morpholinocarbonyl)-pyridine (0.0, mole, 10.5 g.) and methyl iodide (0.06 mole, 8.5 g.) in 300 ml. benzene was heated to reflux for 20 hours. The solid quaternary salt 6-methyl-3-(4-morpholinocarbonyl)-1-methylpyridinium iodide, which formed as a precipitate, was filtered off and recrystallized from ethanol.

c. A solution of 6-methyl-3-(4-morpholinocarbonyl)-1-methylpyridinium iodide (0.02 mole, 7.1 g.), benzaldehyde (0.04 mole, 4.2 g.) and piperidine (1.0 ml.) in 35 ml. dimethyl formamide was stirred at room temperature for 24 hours. After evaporation of the solvent under reduced pressure, the residue was treated with 100 ml. cold water. The precipitate was removed by filtration, washed thoroughly with cold water, then with ether and recrystallized from acetonitrile, to give 5.4 g. of the stilbazole quaternary salt, 6-styryl-3-(4-morpholinocarbonyl)-1-methylpyridinium iodide, M.P. 206°–208° C.

Analysis. — Calculated for $C_{19}H_{21}IN_2O_2$: C, 52.06; H, 4.83; N, 6.39. Found: C, 52.29; H, 4.85; N, 6.21.

d. A suspension of this stilbazole quaternary salt (0.01 mole, 4.4 g.) in 60 ml. water was hydrogenated in the presence of 0.5 g. platinum oxide catalyst at 48 psi for 24 hours. After removal of the catalyst by filtration, the filtrate was neutralized with saturated sodium carbonate solution and then extracted three times with 50 ml. methylene chloride. After drying over anhydrous magnesium sulphate and evaporation of the solvent, the product was purified by elution chromatography using neutral alumina I and anhydrous ether as the eluent, and then recrystallized from ether-n-hexane, to give 2.6 g. 1-methyl-6-phenethyl-3-(4-morpholinocarbonyl)piperidine, M.P. 102°–103° C., $n_D^{29}$ 1.5399.

Analysis. — Calculated for $C_{19}H_{28}N_2O_2$: C, 72.12; H, 8.92; N, 8.85. Found: C, 72.51; H, 9.19; N, 8.56.

EXAMPLE 5

1-methyl-6-(3,4-dimethoxyphenethyl)-3-(4-morpholinocarbonyl)piperidine

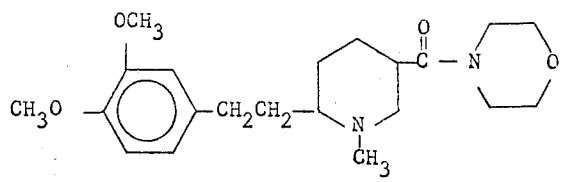

The procedures set forth in Example 4 were repeated, except that in step (c), the benzaldehyde was replaced by 3,4-dimethoxybenzaldehyde (0.04 mole, 6.6 g.) to give 6.3 g. of the stilbazole quaternary salt, 6-(3,4-dimethoxystyryl)-3-(4-morpholinocarbonyl)-1-methylpyridinium iodide, M.P. 237°–238° C.

Analysis. — Calculated for $C_{21}H_{25}IN_2O_4$: C, 50.81, H, 5.08; N, 5.64. Found: C, 50.78; H, 4.89; N, 5.07.

In step (d), the reduction of this stilbazole quaternary salt (0.01 mole, 5.0 g.) gave 3.0 g. 1-methyl-6-(3,4-dimethoxyphenethyl)-3-(4-morpholinocarbonyl)-piperidine, $n_D^{29}$ 1.5409.

Analysis. — Calculated for $C_{21}H_{32}N_2O_4$: C, 66.99; H, 8.57; N, 7.44. Found: C, 66.93; H, 8.37; N, 6.98.

EXAMPLE 6

1-methyl-6-(3,4,5-trimethoxyphenethyl)-3-(4-morpholinocarbonyl)piperidine

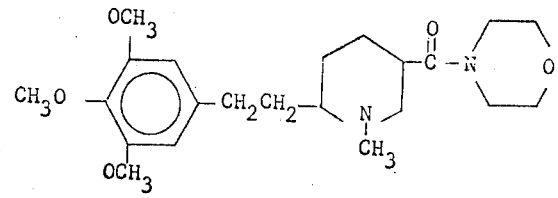

The procedures set forth in Example 4 were repeated, except that in step (c), the benzaldehyde was replaced by 3,4,5-trimethoxybenzaldehyde (0.04 mole, 7.8 g.), to give 6.0 g. of the stilbazole quaternary salt, 6-(3,4,5-trimethoxystyryl)-3-(4-morpholinocarbonyl)-1-methylpyridinium iodide, M.P. 230°–232° C.

Analysis. — Calculated for $C_{22}H_{27}IN_2O_5$: C, 50.19; H, 5.17; N, 5.32. Found: C, 50.51; H, 5.73; N, 5.12.

In step (d), the reduction of this stilbazole quaternary salt (0.01 mole, 5.3 g.) gave 3.3 g. 1-methyl-6-(3,4,5-trimethoxyphenethyl)-3-(4-morpholinocarbonyl)-piperidine, $n_D^{29}$ 1.5405.

Analysis. — Calculated for $C_{22}H_{34}N_2O_5$: C, 65.00; H, 8.43; N, 6.89. Found: C, 65.28; H, 8.73; N, 6.98.

ANTIDEPRESSANT ACTIVITY IN MICE

All of the 1-alkyl-6-arylethyl-3-piperidinecarboxamide compounds prepared in accordance with the above examples were shown to possess moderate to marked antidepressant activity in DOPA response potentiation tests in mice. The table below shows the increase in motor activity due to the potentiation effect at the indicated dosage of each of the 1-alkyl-6-arylethyl-3-piperidinecarboxamide compounds of Examples 1 to 6, as well as a comparison with amitryptyline, a compound known to have antidepressant activity.

| Compound | Oral Dosage, mg./kg. | Increase in Motor Activity |
|---|---|---|
| Example 1 | 25 | 1 |
| do. | 100 | 1 |
| Example 2 | 25 | 3 |
| do. | 100 | 3 |
| Example 3 | 25 | 2 |
| do. | 100 | 2 |
| Example 4 | 25 | 2 |
| do. | 100 | 3 |
| Example 5 | 25 | 3 |
| do. | 100 | 2 |
| Example 6 | 25 | 1 |
| do. | 100 | 2 |
| Amitryptyline | 20 | 3 |

What is claimed is:
1. A piperidine of the formula

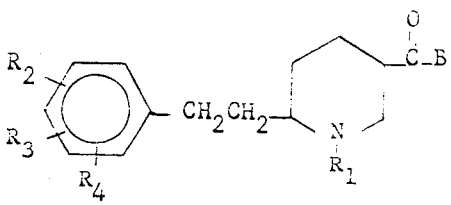

wherein B is a member selected from the group consisting of lower-alkylamino and morpholino, $R_1$ is lower alkyl, and $R_2$, $R_3$ and $R_4$ are each a member selected from the group consisting of hydrogen and lower alkoxy.

2. A compound according to claim 1 which is 1-methyl-6-phenethyl-3-diethylaminocarbonylpiperidine.

3. A compound according to claim 1 which is 1-methyl-6-(3,4-dimethoxyphenethyl)-3-diethylaminocarbonylpiperidine.

4. A compound according to claim 1 which is 1-methyl-6-(3,4,5-trimethoxyphenethyl)-3-diethylaminocarbonylpiperidine.

5. A compound according to claim 1 which is 1-methyl-6-phenethyl-3(4-morpholinocarbonyl)piperidine.

6. A compound according to claim 1 which is 1-methyl-6-(3,4-dimethoxyphenethyl)-3-(4-morpholinocarbonyl)piperidine.

7. A compound according to claim 1 which is 1-methyl-6-(3,4,5-trimethoxyphenethyl)-3-(4-morpholinocarbonyl)piperidine.

* * * * *